United States Patent [19]

Sturza

[11] Patent Number: 4,849,961
[45] Date of Patent: Jul. 18, 1989

[54] FAST SEQUENCING DEMODULATION METHOD AND APPARATUS

[75] Inventor: Mark A. Sturza, Woodland Hills, Calif.

[73] Assignee: Litton Systems, Inc., Beverly Hills, Calif.

[21] Appl. No.: 933,203

[22] Filed: Nov. 21, 1986

[51] Int. Cl.$^4$ .............................................. H04J 13/00
[52] U.S. Cl. ........................................ 370/18; 370/104
[58] Field of Search ............... 370/18, 19, 84, 104; 375/40, 58, 97; 364/443, 444, 445

[56] References Cited

U.S. PATENT DOCUMENTS

| | | | |
|---|---|---|---|
| 3,573,752 | 4/1971 | Lyghounis | 370/18 |
| 4,468,793 | 8/1984 | Johnson et al. | 375/97 |
| 4,642,647 | 2/1987 | Sturza et al. | 342/415 |

OTHER PUBLICATIONS

Dr. M. Bohm et al., "Positionsbestimmung", Funkschau, vol. 58, No. 19, (1986), pp. 49–52.
Phil Ward, "An Advanced NAVSTAR GPS Multiplex Receiver", IEEE Journal (1980), pp. 51–58.
PCT patent application Publication WO 87/01540 of PCT application PCT/US 86/01765 (*/25/96).

Primary Examiner—Douglas W. Olms
Assistant Examiner—Min Jung Kim
Attorney, Agent, or Firm—Elliott N. Kramsky

[57] ABSTRACT

A fast sequencing method and apparatus for use in a radio navigation system of the GPS type. Satellite-coded signals are simultaneously received from a plurality of sources. The signals are decoded in a single channel by multiple samplings of each signal per each signal modulating period. By taking multiple signal samplings per data period, broadband receiver operation is realized, enhancing the suitability of such apparatus for navigation of medium and high g performance vehicles and the like.

9 Claims, 4 Drawing Sheets

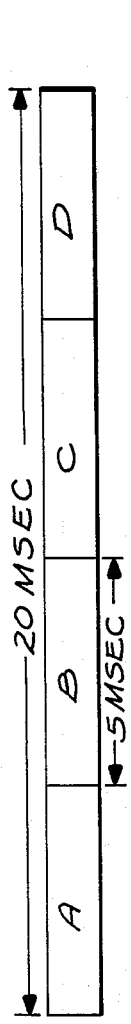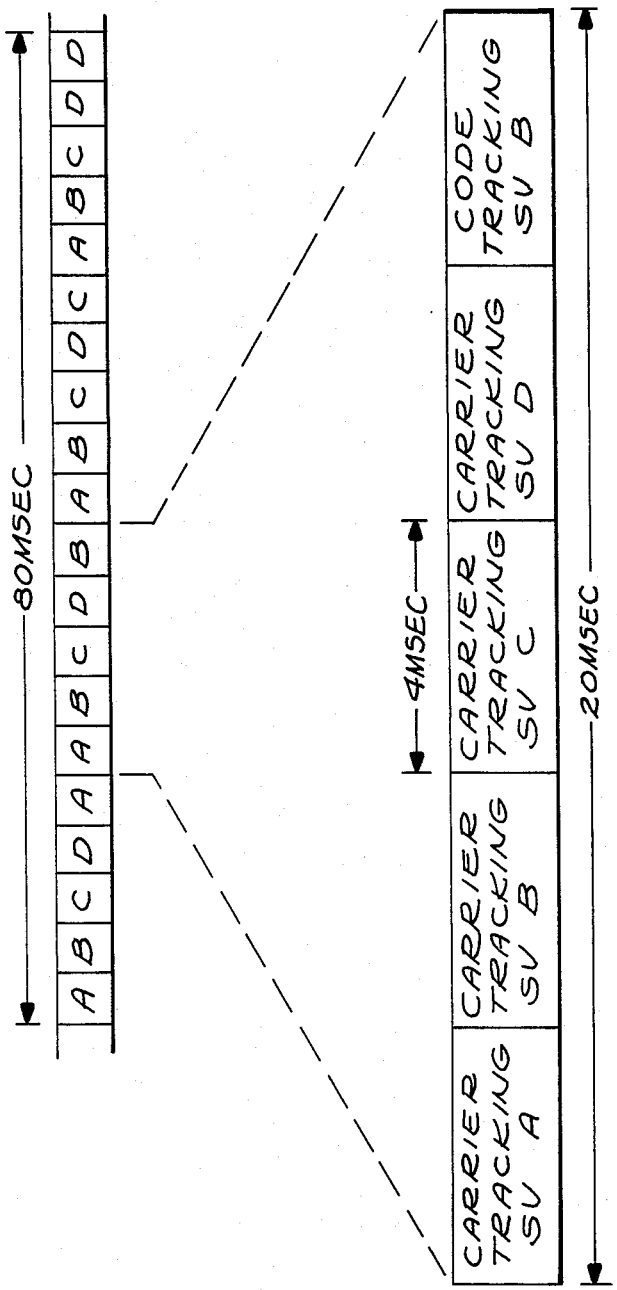
FIG. 1A (PRIOR ART)
FIG. 1B (PRIOR ART)

FAST SEQUENCING DEMODULATION METHOD AND APPARATUS

BACKGROUND

1. Field of the Invention

The present invention relates to a demodulation method and apparatus therefor. More particularly, this invention pertains to the demodulation of simultaneous transmissions from multiple sources such as that encountered when navigating with Global Positioning System (GPS) data.

2. Description of the Prior Art

GPS is a navigation system that includes a plurality of space vehicles (satellites) that transmit radio frequency signals to earth. Each space vehicle's location at any given point in time can be determined with precision by calculation from ephemeris or almanac data. Distances and velocities with respect to such locations can be determined for navigation purposes from the transit times and rate of change of transit times of signals originating with the various satellites. When signals are simultaneously received from at least four satellites, locations and directions on (or below or above) earth can be determined by trilateration methods.

The need to process signals originating from multiple sources complicates the design of GPS-type system receivers. Some designs have featured separate receivers and/or separate dedicated channels in a single receiver to perform the multiple signal demodulation. Such approaches incur significant costs while increasing system power, weight and/or bulk requirements greatly.

Attempts have been made to solve the above problems by multiplexing among the independent signals within a single hardware channel. Such an approach is disclosed in "An Advanced NAVSTAR GPS Multiplex Receiver" by Phil Ward, *IEEE Journal* pp. 51 (1980) and in U.S. patent Ser. No. 4,468,793 of Johnson et al. for "Global Position System (GPS) Multiplexed Receiver". In the system disclosed in that patent, signals from a plurality of satellites are sequentially sampled one time during each transmitted data period.

While the above-described method does result in cost, bulk and power savings, such method is not sufficiently broadband for many applications. Further, the narrowband operation that is achieved by such a system is particularly sensitive to the loss of signal lock that can occur when an earth vehicle (or and airplane or ship) performs relatively "high g" maneuvers.

SUMMARY

The preceding and other shortcomings of the prior art are addressed and overcome by the present invention that provides, in a first aspect, a method for demodulating data transmitted by N signal sources, each of such signals being modulated at a data rate of 1/T. Such method includes the partitioning of each data period T into M equal time intervals. Thereafter, each of the intervals is divided into N equal sub-intervals. One of the signals is tracked for the duration of a sub-interval. Then, such tracking is repeated until each signal is sequentially tracked during an interval. This tracking process is then repeated M times whereby the signals are demodulated over a period of the modulating data.

In another aspect, the invention provides a method for demodulating data transmitted by N coded signal sources, each of such signals being modulated at a data rate of 1/T. Initially, the period of the modulating data T is partitioned into M equal time intervals. Thereafter, each of the intervals is divided into N+1 sub-intervals of equal duration. Then, a signal is tracked for the duration of a subinterval and such signal tracking is repeated until each signal is sequentially tracked. The code of one of the signals is tracked for the adjacent subinterval. Thereafter, the tracking sequence is repeated M times whereby such signals and a single code are tracked over a period of the modulating data.

In yet another aspect, the invention provides apparatus for demodulating N coded signals, each of which is modulated at a data rate of 1/T. Means, responsive to updated signal doppler information, are provided for conditioning such signals. Means are additionally provided for sequentially gating the conditioned signals at M×N times the data rate. N summers are arranged to receive such signals. A multiplexing switch is provided for sequentially directing the gated signals to the summers at M times the data rate. Means are provided for storing such N sums generated during each data period T. Means are additionallly provided for providing updated signal doppler information at a rate of M times the data rate in response to an initial signal doppler estimate and the gated signals. Finally, means, responsive to the updated signal doppler information, provide an initial estimate of signal doppler information at the beginning of each data modulation period.

The foregoing and additional features and advantages of this invention will become further apparent from the detailed description that follows. This description is accompanied by a set of drawing figures. In the figures and in the written description numerals indicate the various features of the invention, like numerals referring to like features throughout both the drawings and the written description.

BRIEF DESCRIPTION THE DRAWINGS

FIGS. 1A and 1B are diagrammatic representations of fast sequencing multiplexing schemes in accordance with the prior art;

DETAILED DESCRIPTION

Turning now to the drawings, FIG. 1A is a diagrammatic representation of a fast sequencing scheme for multiplexing multiple source signals in accordance with the prior art patent of Johnson et al. supra. Such sequencing has been employed, and is useful for navigation in accordance with the multiple satellite GPS system wherein each of a plurality of satellites transmits navigation data (e.g. Doppler information) to an earthbound receiver. The transmissions are encoded for satellite identification.

In the illustrated multiplexing method, signals continuously transmitted by the GPS satellites are sampled a single time during each modulation data period. As the GPS data rate is 50 bits per second, each data bit transmitted by the satellites of the system has a duration, or period, of 20 milliseconds.

Four satellite transmissions illustrate the prior art method (and methods in accordance with the invention, infra). This is consistent with the requirement that the receiver "see" at least four satellites for navigation purposes. A single correlator system is assumed in the scheme of FIG. 1B. Thus, a code tracking function is interspersed with the demodulation of GPS data. A multiple correlator system of the prior art in which code tracking takes place independent of data demodulation, is disclosed in the Johnson et al. patent (i.e. FIG. 1A.)

As can be seen from FIG. 1B, each 20 millisecond long data period is divided into five equal segments. The first four segments are utilized for sequentially sampling data from the four satellites while the fifth segment is utilized for sampling the code of one of the satellites. The 20 millisecond long sampling interval is repeated over and over, with a different satellite code sampled each time so that, over four such intervals, the code of each satellite is sequentially sampled. Thus, eighty milliseconds are required to code track all four satellite signals.

The prior art multiplexing scheme described above permits one receiver channel to perform the functions of five dedicated hardware- channels. Thus, significant savings are realized.

Figure 2:
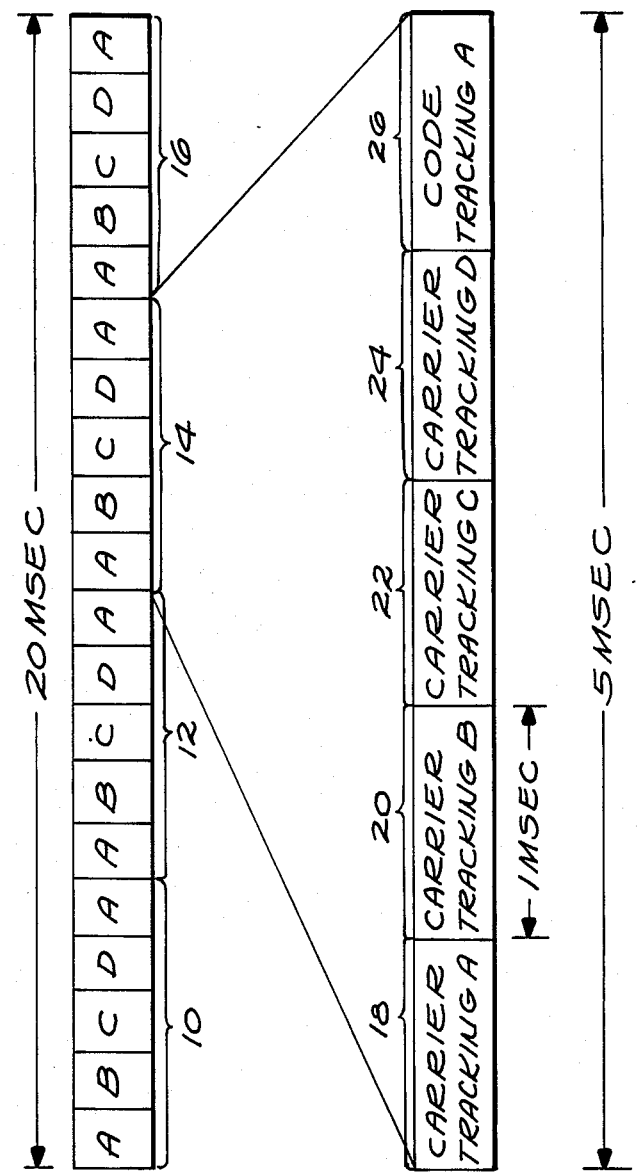
FIG. 2 is a like diagrammatic representation of a single correlator fast sequencing scheme according to the invention.

FIG. 2 is a like diagrammatic illustration of the fast sequencing method for multiplexing a plurality of signals in accordance with the invention. As in the prior art example, the illustrated method is adapted to a receiver system that utilizes a single correlator. Thus, code tracking is combined with carrier demodulation, permitting a single receiver channel to accomplish the functions of five dedicated hardware channels. As such the cost advantages of the illustrated prior art method are similarly realized with the present invention.

The method of the invention multiplexes the signals from the satellites onto the single receiver channel. Unlike the prior art, however, the data demodulation period is divided into four equal time intervals 10, 12, 14 and 16. Each of such intervals is further divided into a sufficient number of equal time subintervals, such as the subintervals 18, 20, 22, 24 and 26 that make up the interval 14, to permit all required carrier and code sampling to occur during each interval.

The method bears some superficial resemblance to the prior art insofar as it sequentially samples the data from the satellites. This, of course, is not unexpected insofar as both methods address the problem of multiplexing a plurality of signals onto a single sampling channel. However, the prior art does not address significant problems that occur in operational navigation systems.

Navigation systems are generally rendered useless when they cannot attain and maintain "lock" onto known monuments. In the case of GPS navigation, the satellite transmitters act as the system's monuments. The exact locations of the satellites are available to the user who enters appropriate ephemeris data into the system model. The ephemeris data and status information are collected from the satellites during an initialization process known as "slow sequencing". This process requires the receiver to dwell between eighteen and thirty seconds upon each satellite, collecting data in one millisecond samples, to assure that all required information is collected. Each time lock is lost, this rather time- consuming process must be repeated and, of course, a significant amount of navigation data will be lost to the system during each re initialization "break".

Applicant's invention addresses and overcomes inherent limitations of the prior art that prevent realization of the significant hardware savings afforded by fast sequencing. Such limitations relate to the limited "g capability" offered by the prior art discussed above. While the receiver's two-sided 3 dB bandwidth during the slow sequencing initialization process is 500 Hz as a result of the one millisecond dwell time employed, it decreases to 25 Hz during the subsequent navigation mode when the prior art method is utilized. This is a reflection of the fact that the prior art sampling period is 20 milliseconds. In accordance with the Nyquist criterion, the bandwidth is one-half of the sampling frequency (50 Hz).

By subdividing the period of the data modulation into one millisecond sampling subintervals, the sampling period for the method in accordance with the embodiment of FIG. 2 becomes 5 milliseconds. In accordance with the Nyquist criterion, the bandwidth of the system is one half of the 200 Hz sampling frequency. Thus, a four-fold increase in bandwidth is realized. This represents a significant improvement in a critical area of navigation performance as the ability of the GPS receiver to reacquire satellite signals or to acquire new signals during fast sequencing can place severe constraints upon the practical application of such a system.

Figure 3:
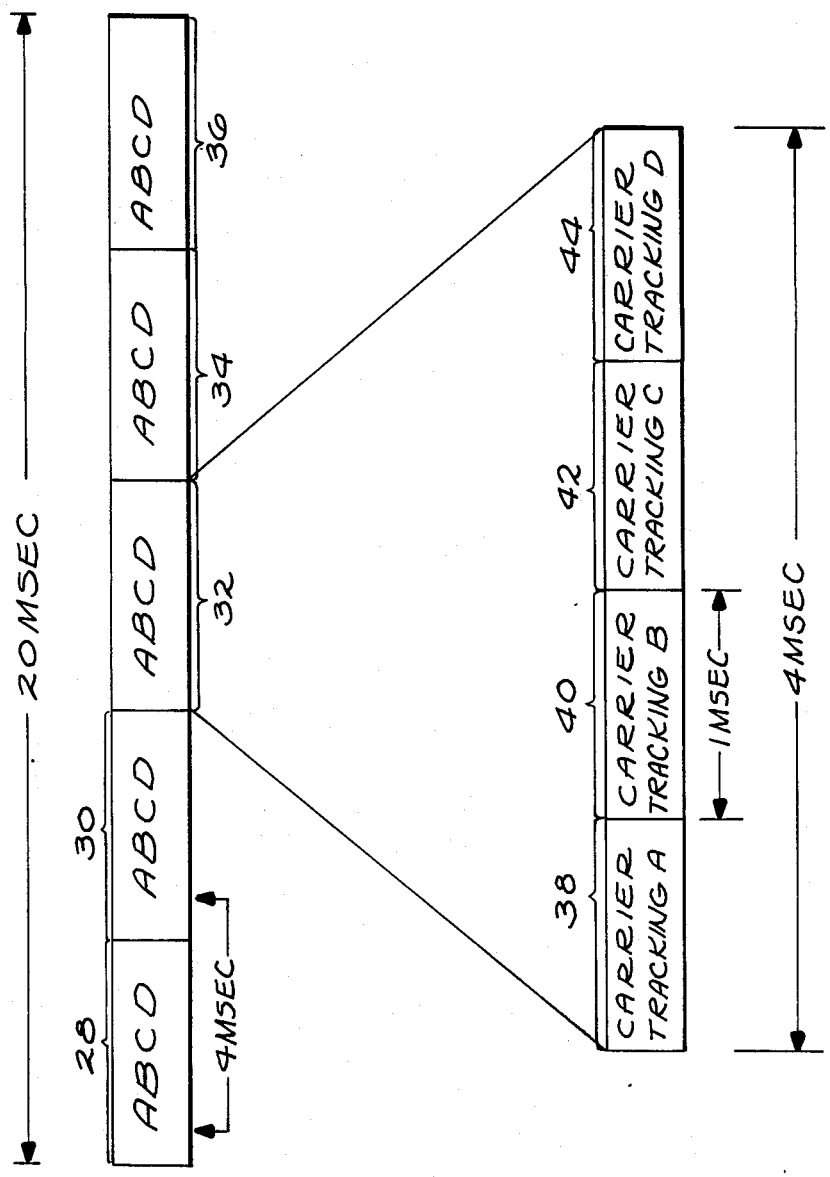
FIG. 3 is diagrammatic representation of a multiple correlator fast sequencing scheme in accordance with an alternative preferred embodiment of the invention.

FIG. 3 illustrates an alternative embodiment of the invention wherein the receiver is assumed to employ a multiple correlator configuration. As mentioned above, such a system permits simultaneous code and carrier tracking to take place. Once again, the period of the modulation is divided into intervals of equal duration. Since a time slot needn't be utilized for code sampling, five intervals 28, 30, 32, 34 and 36 are employed. Each interval is further partitioned into subintervals of one millisecond duration, such as the subintervals 38, 40, 42 and 44 that make up the interval 32.

As a result of the additional interval attained when codes are sampled apart from the carriers, the embodiment of FIG. 3 achieves an even greater improvement in receiver bandwidth than that of the prior method of the invention. The carrier sampling period is four milliseconds. Thus, by the Nyquist criterion, the two-sided 3 dB bandwidth for carrier tracking is, in this instance, 125 Hz, a five-fold improvement over the prior art in this critical area of performance.

Figure 4:
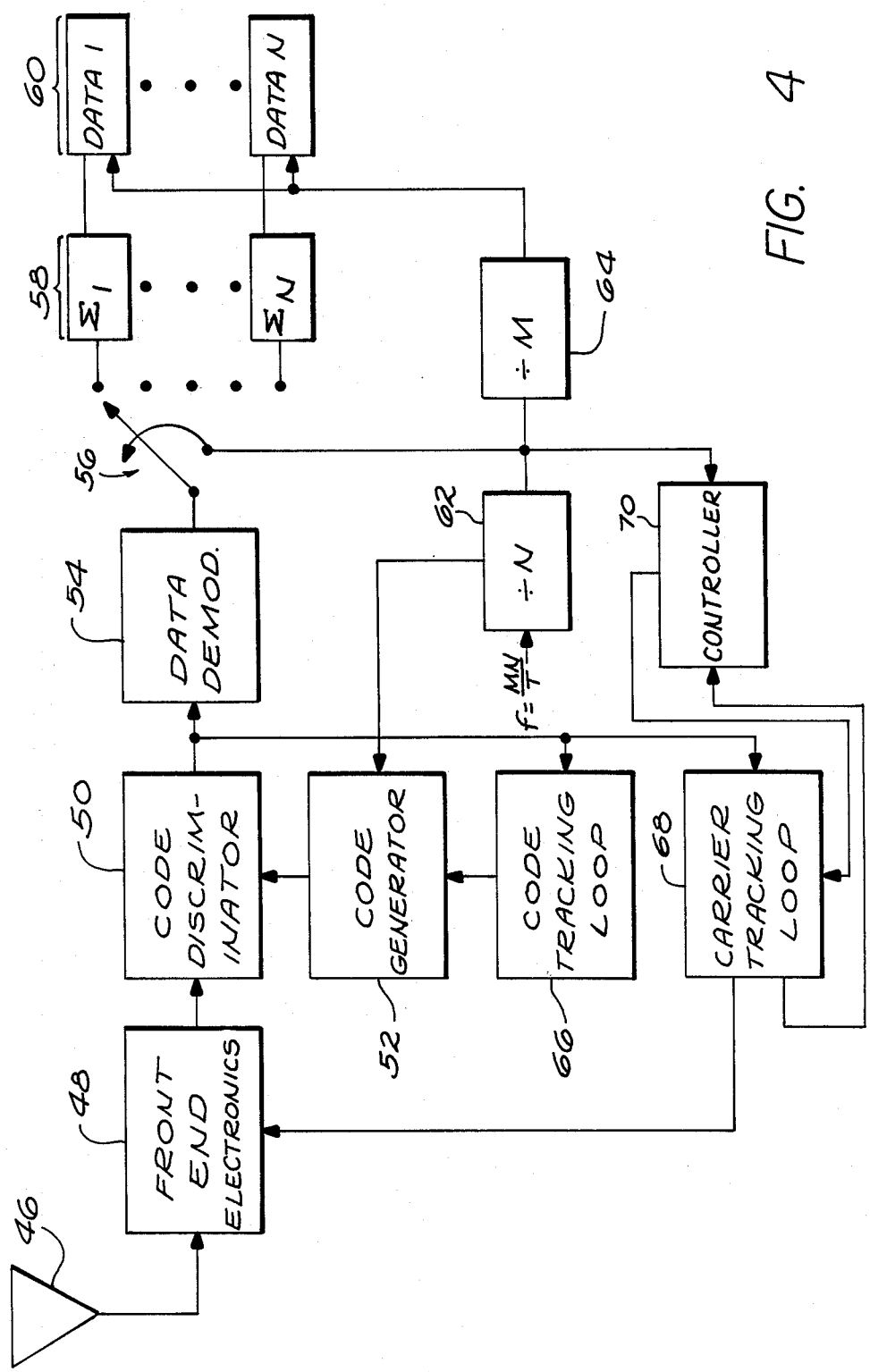
FIG. 4 is a schematic diagram of apparatus for providing fast sequencing multiplexing of multiple source signals in accordance with the invention.

FIG. 4 is a block diagram of receiver apparatus of the multiple-correlator type for performing fast sequencing in accordance with the invention. GPS satellite transmissions energize an antenna 46 to communicate corresponding signals to conventional front end receiver electronics 48 for performing necessary filtering, amplification, down conversion and Doppler removal functions. The antenna 46 is simultaneously energized by a plurality of satellite transmissions and a corresponding plurality of intermediate frequency (IF) signals is generated. As all GPS satellite transmissions are encoded, the IF signals include coding. A code discriminator 50 accepts the conditioned IF outputs of the front end electronics 48 and, responsive to the output of a code generator 52, passes a selected signal therethrough, blocking all others. The code discriminator 50 effectively strips the coding from the outputs.

The multiplexed outputs of the discriminator 50 are applied serially to a data demodulator 54. The demodulator extracts the data bits therefrom. A multiplexing switch 56 sequentially directs the data bits to a plurality of summers 58. In the instance of a GPS-type navigation system four summers 58 would be adequate, although more could be employed. The outputs of the summers 58 are applied to a plurality of registers 60, each of which is arranged to accept the output of one of the summers 58.

The multiplexing switch 56 is controlled by the output of a divide-by-N counter 62 wherein N is the number of transmitting satellites. A signal whose frequency is calculated as follows:

(number of satellites)(number of subintervals)/(data bit period) is applied to the counter. Thus the switch 56 multiplexes the stream of data at a rate that is equal to the number of subintervals divided by the period of the modulating data bits. This corresponds to the division of data into subintervals of the modulating data period as discussed above with reference to the methods of FIGS. 2 and 3. (Note that, in a single correlator system, a divide-by-(N+1) counter would replace the divide-by-N counter 62, while an additional summer 58 and register 60 would be required.

Data is clocked into the registers 60 under control of a divide-by-M counter 64 where M is the number of subintervals as determined in accordance with the invention. Thus the frequency of the output of the counter 64 is equal to the modulating data bit rate. By clocking each of the registers 60 one time per bit period, an output from the summers 58 is entered into the corresponding one of the registers 60 each data period. In addition to the other advantages offered by the present invention, the demodulation of data through a process in which a plurality of samples of each data bit is taken adds reliability that is is not found in the single sample systems of the prior art. Present-day computers are easily capable of performing the sampling rates required by the present invention. As the number of subintervals becomes larger and larger and the number of times each data bit is sampled increases the system gets closer and closer to, and therefore approaches the inherent advantages of, the continuous tracking offered by the costly multiple-channel systems of the prior art.

The code generator 52 may be one of a number of devices for providing the predetermined GPS satellite codes. Such apparatus may comprise an array of registers or a device that relies upon a look-up table stored within a read only memory (ROM) such as that disclosed in U.S. Pat. No. 4,642,647 of Sturza et al. for "Signal Generator For Radio Navigation System".

The codes stored within the generator 52 are clocked out (and input to the code discriminator 50) by the output of the divide-by-N counter 62. The output of the counter 62 comprises a repeating sequence of the numbers 1 through N, each designating a particular GPS satellite and thereby calling up its code. As mentioned earlier, the frequency of this output is equal to the number of subintervals divided by the period of the modulating data.

The phases of the codes output from the generator 52 are adjusted by means of a code tracking loop 66. The loop 66, preferably a delay lock loop, accepts the output of the code discriminator 50, which includes the coding of the signal that is passed therethrough, and, accordingly, outputs an updated phase estimate to the generator 52. This phase is utilized by the generator 52 to line up its code outputs with the code inputs to the discriminator 50. The code of a single satellite is examined throughout each sampling interval. This, of course, includes a number of subintervals. Thus, the phase of a single code is adjusted M times during a data period.

The output of the code discriminator 50 is also applied to a carrier tracking loop 68. The carrier tracking loop 68 accepts the output of a controller 70 that is programmed to supply initial doppler frequency estimates per interval for satellites as designated by the divide-by-N counter 62. Such estimates may be derived from the satellite ephemeris models stored within the controller 70.

The carrier tracking loop 68 supplies the actual doppler information to the controller 70, enabling the controller to update the initial doppler frequency estimates for the following interval. The loop 68, which may comprise a conventional Costas-loop configuration, determines an updated doppler frequency estimate from the initial estimate provided by the controller 70 and the output of the front end electronics 48. This estimate is updated M times per interval (per satellite) as the output of the code discriminator 50 changes at this rate under the control of the divide-by-N counter 62-clocked code generator 52.

The front end electronics 48 utilizes the doppler information it receives from the carrier tracking loop 68 to adjust the satellite frequency passbands of its various filters. As the electronics 48 receives a plurality of estimates per satellite per period of modulating data, the bandwidth of the system shown in FIG. 4 is increased in accordance with the present invention over systems of the prior art in which a single sample is taken per satellite per modulating data interval. Thus the harmful results of loss of lock (through maladjustment of the receiver front end electronics) are minimized by the incorporation of apparatus in accordance with the invention into GPS-type receivers.

By incorporating the teachings of the invention into a receiver, one is thus able to achieve the cost and simplicity of manufacture, maintenance and operation offered by the fast sequencing of a plurality of transmissions onto a single data channel without unnecessarily complicating navigation in high g environments. Practically, the invention offers the operational advantages of continuous tracking without sharing inherent diseconomies.

While this invention has been described with reference to its presently preferred embodiment, its scope is not limited thereto. Rather, such scope is only limited insofar as defined by the following set of claims and includes all equivalents thereof.

What is claimed is:

1. In a fast sequencing method for sampling N simultaneously received signals in a multiple correlator system wherein each of said signals is modulated with data at a rate of 1/T, each data bit being of duration T, and wherein said signals are received and sequentially sampled by a single channel, the improvement comprising the steps of:

(a) selecting an integer $M \geq 1$; then (b) determining a sampling interval $s = T/(N \times M)$; then (c) sequentially sampling, for each sampling interval s, the data from each one of said N signals M times during each data modulation period T such that each one of said N signals is sampled once during each interval of duration $N \times s$, the samples from each signal being uniformly spaced with interval N×s between samples from the same signal; and (d) sequentially repeating step "c" over multiple periods of data modulation.

2. A method as defined in claim 1 wherein at least four signals are received.

3. A method as defined in claim 2 further characterized in that:
(a) said data rate is 50 bits per second;
(b) four signals are received;
(c) each signal is sampled M=5 times during each data period; and
(d) each sampling interval is one millisecond in duration.

4. A method as defined in claim 2 wherein said signals are transmitted from GPS system satellites.

5. In a fast sequencing method for sampling N simultaneously received, individually coded signals in a single correlator system wherein each of said signals is modulated with data at a rate of 1/T, each data bit being of duration T, and wherein said signals are received and sequentially sampled by a single channel, the improvement comprising the steps of:
(a) selecting an integer M? 1; then
(b) determining a sampling interval s=T/((N+1)×M); then
(c) sequentially sampling data from each one of said N signals times for sampling intervals equal to s during each data modulation period T; and
(d) sampling the code of one of said N signals M times per each period of data modulation T, said samplings of said code occurring once per each sequential sampling of said N signals; and then (e) sequentially repeating steps "c" and "d" over at least N periods of data modulation whereby the code of each of said N signals is tracked for at least one period T.

6. A method as defined in claim 5 wherein at least four signals are received.

7. A method as defined in claim 6 further characterized in that:
(a) said data rate is 50 bits per second;
(b) four signals are received;
(c) each signal is sampled M=4 times during each data period T; and
(d) each sampling interval is one millisecond in duration.

8. A method as defined in claim 6 wherein said signals are transmitted from GPS system satellites.

9. Apparatus for demodulating N coded signals, each of said signals being modulated with data at a rate of 1/T, comprising, in combination:
(a) means for sequentially selecting a sample of each of said N signals;
(b) means for sequentially gating each of said selected N signals at M×N times the data rate where M is an integer that is greater than or equal to one;
(c) N summers, each of said summers being arranged to sum said samples of one of said N signals;
(d) a multiplexing switch for sequentially directing said selected gated signal samples to said N summers to generate N signal sums at M times the data rate; and
(e) means for storing said N signal sums generated during each data period T.

* * * * *